(12) United States Patent
Andrade et al.

(10) Patent No.: US 9,244,735 B2
(45) Date of Patent: *Jan. 26, 2016

(54) MANAGING RESOURCE ALLOCATION OR CONFIGURATION PARAMETERS OF A MODEL BUILDING COMPONENT TO BUILD ANALYTIC MODELS TO INCREASE THE UTILITY OF DATA ANALYSIS APPLICATIONS

(71) Applicant: International Business Machines Corporation, Armonk, NY (US)

(72) Inventors: Henrique Andrade, Croton-on-Hudson, NY (US); Bugra Gedik, White Plains, NY (US); Vibhore Kumar, Stamford, CT (US); Kun-Lung Wu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 14/149,374

(22) Filed: Jan. 7, 2014

(65) Prior Publication Data
US 2014/0215484 A1    Jul. 31, 2014

Related U.S. Application Data

(63) Continuation of application No. 12/721,649, filed on Mar. 11, 2010, now Pat. No. 8,645,966.

(51) Int. Cl.
*G06F 9/46* (2006.01)
*G06F 11/34* (2006.01)
*G06F 9/50* (2006.01)

(52) U.S. Cl.
CPC .............. *G06F 9/50* (2013.01); *G06F 11/3447* (2013.01)

(58) Field of Classification Search
CPC ........................................................ G06F 9/50
See application file for complete search history.

(56) References Cited

U.S. PATENT DOCUMENTS

| | | |
|---|---|---|
| 7,401,062 B2 | 7/2008 | Li et al. |
| 8,238,231 B2 | 8/2012 | Klein |
| 2005/0172291 A1 | 8/2005 | Das et al. |
| 2008/0298503 A1* | 12/2008 | Amini ............... A61B 5/04012 375/316 |
| 2011/0225584 A1 | 9/2011 | Andrade et al. |

OTHER PUBLICATIONS

Dean, Jeffrey and Sanjay Ghemawat, "MapReduce: Simplified Data Processing on Large Clusters," Proc. 6th OSDI, Dec. 2004, pp. 137-150.
Office Action for U.S. Appl. No. 12/721,649 dated Dec. 18, 2012, pp. 1-17.

(Continued)

*Primary Examiner* — Abdullah Al Kawsar
*Assistant Examiner* — Jorge A Chu Joy-Davila
(74) *Attorney, Agent, or Firm* — Jeff Tang, Esq.; Matthew M. Hulihan, Esq.; Heslin Rothenberg Farley & Mesitit P.C.

(57) ABSTRACT

Data analysis applications include model building components and stream processing components. To increase utility of the data analysis application, in one embodiment, the model building component of the data analysis application is managed. Management includes resource allocation and/or configuration adaptation of the model building component, as examples.

20 Claims, 7 Drawing Sheets

(56) References Cited

OTHER PUBLICATIONS

Final Office Action for U.S. Appl. No. 12/721,649 dated Jul. 2, 2013, pp. 1-16.

Notice of Allowance for U.S. Appl. No. 12/721,649 dated Sep. 30, 2013, pp. 1-15.

\* cited by examiner

MANAGING RESOURCE ALLOCATION OR CONFIGURATION PARAMETERS OF A MODEL BUILDING COMPONENT TO BUILD ANALYTIC MODELS TO INCREASE THE UTILITY OF DATA ANALYSIS APPLICATIONS This invention was made with Government support under Contract No.: H98230-07-C-0383 awarded by Department of Defense. The Government has certain rights in this invention.

This application is a continuation of U.S. Ser. No. 12/721,649, entitled "MANAGING MODEL BUILDING COMPONENTS OF DATA ANALYSIS APPLICATIONS," filed Mar. 11, 2010, now issued as U.S. Pat. No. 8,645,966, which is hereby incorporated herein by reference in its entirety.

BACKGROUND

This invention relates, in general, to data processing within a computing environment, and in particular, to processing data analysis applications within such an environment.

Data analysis applications are used to analyze data produced by one or more sources. One example of a data analysis application is a real-time data analysis application, which analyzes and processes data as it is received. For instance, real-time data analysis applications analyze real-time data produced by continuous sources, such as trading transactions from the stock market, alarms from a manufacturing plant, etc. Real-time data analysis applications are used in multiple domains, including automated stock trading, network monitoring, security and surveillance, fraud detection, among others.

In one example, a data analysis application may use an analytic model to process data. For instance, in stock trading, the real-time data analysis application may employ frequently updated analytic model(s) of market and/or stock price behavior (based on historical data) to execute trades in real-time by processing an incoming stream of bid and quote transactions. Likewise, fraud detection applications also typically employ behavioral fraud models to score incoming financial transactions, such as credit card or wire transfer transactions.

BRIEF SUMMARY

In one example, a data analysis application includes a stream processing component and a model building component, which builds the analytical model to be used by the stream processing component. With such applications, the utility (or usefulness) of the data analysis application depends not only on the component that processes the stream of data (e.g., in real-time), but also on the model building component in terms of accuracy of the predictions from the particular analytical model in use.

A model building component configured to update the analytic model at a higher frequency or generate a higher quality analytic model may require more compute resources, implying a higher cost in contrast to performing these operations at a lower frequency. In scenarios where the resources are shared between the model building component and the stream processing component, allocating more resources to the model building component to provide a better model implies less resources available for the stream processing component, increasing latency and, potentially, decreasing other application performance metrics, and vice-versa.

The model building component and the stream processing component are normally managed independent of each other, even if they share the same set of compute resources. In so doing, the data analysis application may not have the most accurate, or most up-to-date, model to use—resulting in poor utility of the data analysis application.

Therefore, in one aspect of the present invention, the model building component and the stream processing component are managed in a coordinated manner. In one aspect, a capability is provided to govern the model building component of a data analysis application, such that the utility of the data analysis application is increased.

The shortcomings of the prior art are overcome and additional advantages are provided through the provision of a method of managing data analysis applications in a computing environment. The method includes, for instance, determining current utility of a data analysis application using an algebraic formulation or a procedural formulation to determine the current utility, the data analysis application to analyze data produced by one or more sources and including a model building component and a stream processing component, the model building component to build an analytic model to be used by the stream processing component to process a stream of data; and automatically adjusting, by a processor, at least one of allocation of resources for the model building component or a configuration of the model building component, the configuration including at least one configuration parameter input to the model building component for use in building the analytic model, the automatically adjusting to increase the current utility of the data analysis application.

System and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for managing a data analysis application, such that the utility of the data analysis application is improved (e.g., increased, maximized, or optimized). As one particular example, the data analysis application is a real-time data analysis application that analyzes and processes data as it is received, and the managing includes managing the resource allocation or configuration of a model building component of the real-time data analysis application.

Real-time data analysis applications employ, in one example, periodically updated analytic models for processing live streams of data. In such applications, the utility of the delivered real-time data analysis is dependent not only on the capability of the application to efficiently and correctly process a stream of updates, but also on the quality of the analytic model(s) used to process the continuously generated streaming data ingested by the application. Thus, in one example, a framework is provided that increases (e.g., maximizes or optimizes) the utility of the real-time data analysis application by managing the component used for building the analytic model(s) employed by the application.

In accordance with one aspect of the invention, the following assumptions are used in describing the framework:

1. The real-time data analysis application includes a model building component and a stream processing component;
2. The two components of the real-time data analysis application execute on a shared set of computing resources;
3. Analytic models are derived from relatively transient datasets, and thus, an analytic model is to be periodically updated, such that it incorporates information from fresher data;
4. Model building components expose some configuration parameters, e.g., option to process full or partial dataset for building the model; option to speedup slowdown the frequency of model building; and option to use alternative model building components;
5. The application and system indicators, such as computing resources consumption and application utility, being used are observable;
6. The knowledge of relationship between the configuration parameters and the observed application and system metrics.

Figure 1:
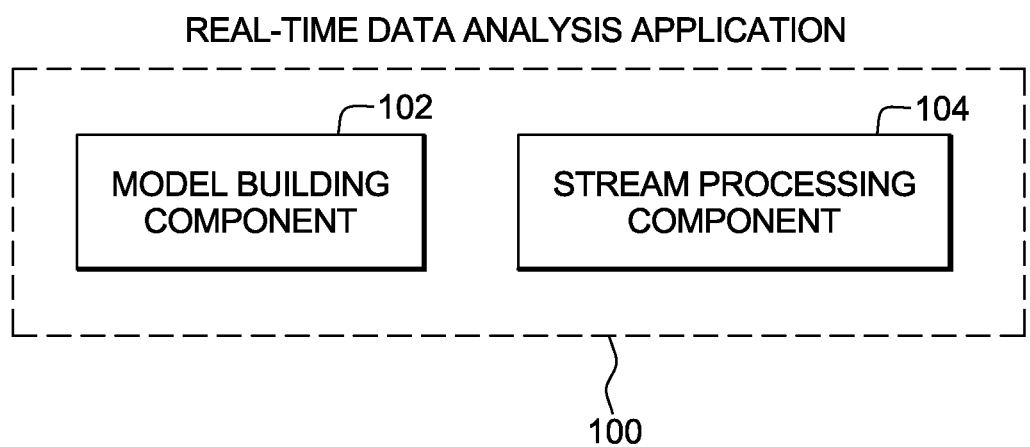
FIG. 1 depicts one example of a real-time data analysis application, in accordance with an aspect of the present invention.

Referring to FIG. 1, a real-time data analysis application 100 includes, for instance, a model building component 102 and a stream processing component 104. Model building component 102 is used to create one or more analytic models, which are used by stream processing component 104 to analyze the streaming input data. The interaction between the model building component and the stream processing component is depicted in FIG. 2.

Figure 2:
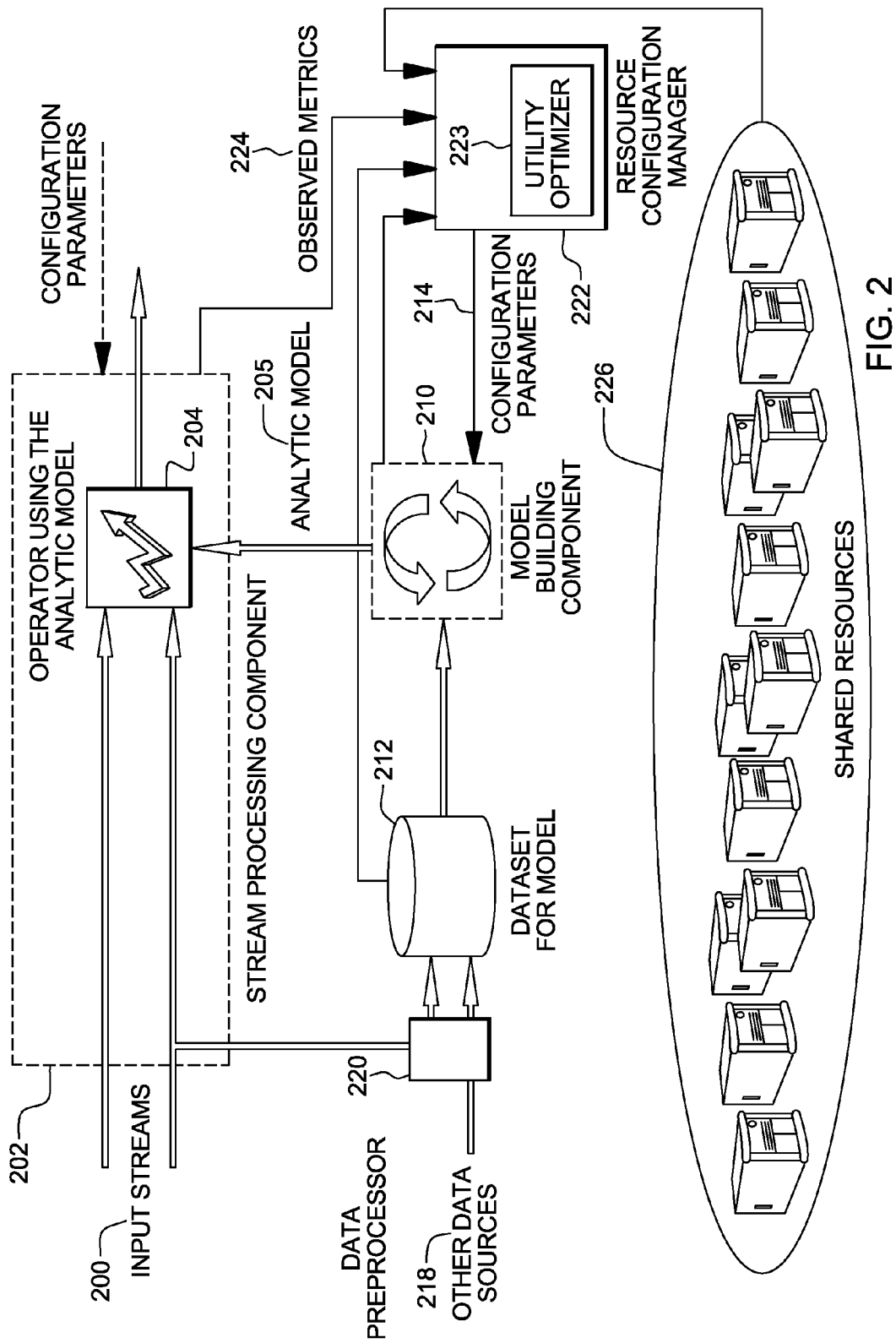
FIG. 2 depicts one example of the interaction between components of a real-time data analysis application, in accordance with an aspect of the present invention.

Referring to FIG. 2, one or more input streams 200 (e.g., stock bids and/or quotes) are input into a stream processing component 202, which includes, for instance, one or more operators 204 that use analytic models 205 in processing live data. An analytic model is, for instance, a representation of derived or pre-existing knowledge that can assist in data analysis by providing capabilities, like classification, prediction or estimation. These models are represented, in one embodiment, as data structures, such as Bayesian networks, decision trees, neural networks, among others. Analytic model 205 is an output of a model building component 210.

Model building component 210 includes, for instance, one or more analytic building techniques (e.g., Bayesian inference, decision tree construction, etc.) and a setup to configure, calibrate, and backtest the model. In one example, these techniques may be implemented as MapReduce jobs to generate models from stored datasets. MapReduce is discussed in further detail below. MapReduce is described in "MapReduce: Simplified Data Processing on Large Clusters," Jeffrey Dean and Sanjay Ghemawat, Proc. 6th OSDI, December 2004, pp. 137-150.

Model building component 210 receives as input a dataset 212 and one or more configuration parameters 214. Dataset 212 is a collection of data from one or more sources, including, but not limited to, a snapshot of past data that has been streamed in; and/or other data sources 218. In one example, the one or more sources are input to a data preprocessor 220, which provides the data to dataset 212.

Configuration parameters 214 for the model building component are provided, in one example, by a resource configuration manager 222, which utilizes a utility optimizer 223. The utility optimizer is, for instance, a component used to dynamically compute the appropriate parameters for running the stream processing application. Such parameters are computed, for instance, as to increase the utility delivered by the stream processing application, as specified by the formulation described herein. In particular examples, the parameters are computed to maximize the utility.

The resource configuration manager receives as input a new dataset 212 used for computing/updating the analytic model, observed performance metrics 224 from the stream processing component, and an indication of the shared resources 226 to be used by model building component 210 and/or stream processing component 202. Configuration parameters 214 include, for instance, option to process full or partial dataset for building the model; option to speedup/slowdown the frequency of model building; and option to use alternative model building techniques. Examples of observed performance metrics include memory consumption and CPU utilization of the nodes used by the application, as well as application-specific metrics related to the result the application produces, such as prediction accuracy, throughput, etc.

Figure 3:
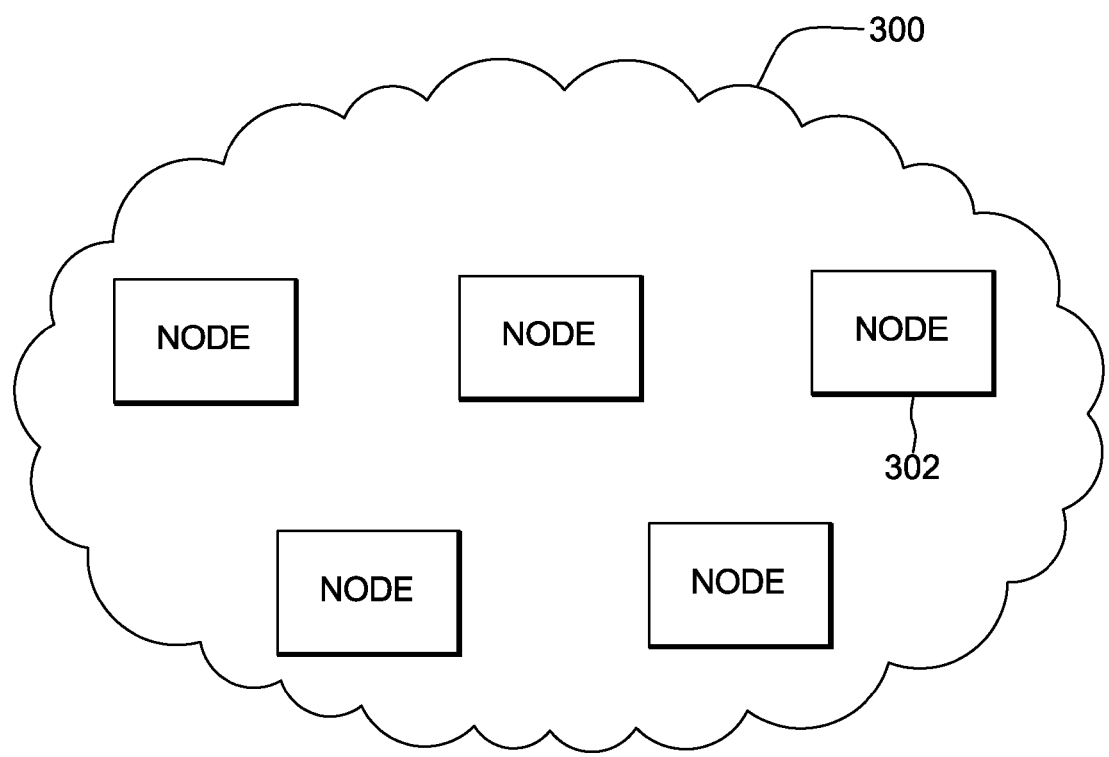
FIG. 3 depicts one example of a cluster of nodes to execute a real-time data analysis application, in accordance with an aspect of the present invention.

In accordance with an aspect of the present invention, the real-time data analysis application executes on a cluster of nodes. As depicted in FIG. 3, a cluster 300 includes a plurality of nodes 302. In one example, the cluster includes hundreds of nodes. The nodes of the cluster may be the same or different from one another. In one example, each node of one or more of the nodes includes a central processing unit (CPU), a memory and I/O devices. As a particular example, cluster 300 includes two sets of nodes: a first set having Intel® Xeon® 3.4 GHz CPUs, 6 GB RAM, and 2 hard disks, each with a capacity of 36.4 GB; and the second set having 2× dual core Intel® 3.0 GHz CPUs, 8 GB RAM, and 2 hard disks, each with a capacity of 73.4 GB. Although two different sets of nodes are described in this cluster, in other examples, the cluster may have only one type of node or more than two types of nodes. Further, different types of nodes may be used. Intel® and Xeon® are registered trademarks of Intel Corporation, Santa Clara, Calif. Other names used herein may be trademarks of other companies, including the International Business Machines Corporation, Armonk, N.Y.

Figure 4:
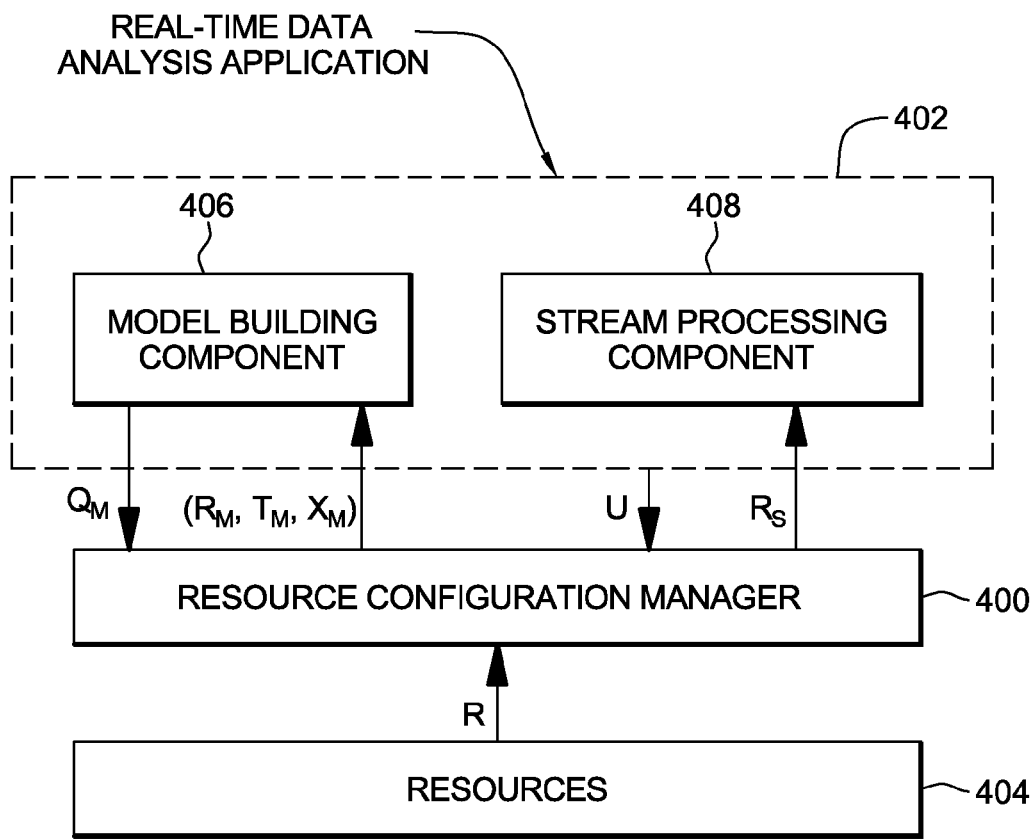
FIG. 4 depicts one example of a resource configuration manager to manage a real-time data analysis application, in accordance with an aspect of the present invention.

As one example, at least one node is used to manage the real-time data analysis application, in accordance with one aspect of the present invention. For instance, a resource configuration manager executing on the at least one node obtains the observed metrics and/or other information and manages the model building component of the real-time data analysis application to, e.g., increase the utility of the real-time data analysis application. In the examples described herein, the resource configuration manager manages the model building component to maximize utility of the data analysis application; however, in other examples, the utility need not be maximized. One embodiment of the managing is described in further detail with reference to FIG. 4.

A resource configuration manager 400 is used to maximize the utility (U) of a real-time data analysis application 402 by, for instance, managing the allocation of resources (R) 404 to a model building component 406 of the real-time data analysis application (e.g., adjusting the resources allocated to the model building component) or by managing the configuration of the model building component (e.g., changing one or more of the configuration parameters), as examples. Resource configuration manager 400 has available to it a plurality of computing resources 404 to be shared amongst model building component 406 and a stream processing component 408 of real-time data analysis application 402.

Resource configuration manager 400 allocates one or more of the resources ($R_S$, where $R_S<R$) to stream processing component 408, and one or more of the resources ($R_M$) to model building component 406. In one example, $R_M=R-R_S$; however, in other examples, $R_M$ can be less than $R-R_S$. Resource configuration manager 400 also provides to the model building component, in one example, various configuration parameters, including a time allowed for building a new analytic model ($T_M$) and an indication of a technique employed for building the analytic model ($X_M$), as examples.

By providing. $R_M$, $T_M$, and $X_M$ to the model building component, the resource configuration manager is able to receive a value that represents the quality ($Q_M$) of the analytic model built by the model building component and employed by the stream processing component. Usually, the more resources that are devoted to model building, the higher the quality $Q_M$ is, until a local or global maximum improvement point is reached. In one example, $Q_M$ may be dependent on the amount of computational resources $R_M$ allocated to the model building component, the time $T_M$ allowed for building a new analytic model, and the technique $X_M$ employed for building the analytic model.

Further, using specific settings for $Q_M$ and $R_S$, the resource configuration manager obtains a value representing the utility (U) of the real-time data analysis application. In one example, U is computed as some chosen function of the resources $R_S$ allocated to the component that processes the real-time stream of updates and the quality $Q_M$ of the analytic model that is employed by the stream processing component processing the real-time stream of incoming data. Examples of computing $Q_M$ and U are described below.

In one example:

$$Q_M = g(R_M, T_M, X_M), \text{ where } g \text{ is some chosen function.}$$

For instance, in one embodiment $Q_M$ may be defined as follows:

$$Q_M = \begin{cases} k_1 \% R_M \% T_M \text{ when } X_M=\text{Model Building Technique 1} \\ k_2 \% (R_M + T_M) \text{ when } X_M=\text{Model Building Technique 2} \\ k_3 \% (R_M \% R_M + T_M) \text{ when } X_M=\text{Model Building Technique 3} \end{cases}$$

and $k_1$, $k_2$, and $k_3$ are floating point constants and can be set to whatever values are adequate for model construction, such as $k_1=1.51$, $k_2=2.96$, and $k_3=3.14$, as examples.

As one particular example, the technique for processing large and static datasets ($X_M$) might rely on the computational framework MapReduce, proposed by Google, Inc., Mountain View, Calif. MapReduce is a programming model and multiple implementations, such as Apache Hadoop, exist and are designed for processing and analyzing large data sets. The model involves the specification of two main functions, Map and Reduce.

The Map function reads the input data using an application specific data format, processes the data and generates a set of intermediate <key, value> pairs. The Reduce function operates on a subset of generated intermediate <key, value> pairs, such that the pairs with the same key belong to one subset, and outputs one or more output <key, value> pairs in the sorted order.

A typical implementation of the MapReduce programming model includes a distributed file system, a runtime that supports distributed execution of Map and Reduce tasks on the nodes hosting the distributed file system and default implementation of some of the programming model concepts, like input formats, output formats, partition functions, among others.

When employing the MapReduce computational framework, the user specifies the pair of Map and Reduce tasks that conform to the requirements of the programming model, but the details of parallelization, task setup, concurrent data access and fault-tolerance are all hidden from the user and provided by the particular MapReduce framework being used (e.g., Apache Hadoop). This level of abstraction allows the user to focus on the analytic part of model building and makes it a very convenient platform for developing massively scalable data-analysis techniques, when the particular model building technique can be expressed as a sequence of map/reduce steps.

The MapReduce computational framework can also be used to conveniently provide a degree of the configurability for the model building component. As examples, the metrics which can be controlled or configured include the fraction of the historic dataset to be processed, as for example, a time interval encompassing the relevant data. This selection affects the quality of the model and, ultimately, the accuracy of the decisions the application makes. Also, the time taken to construct the model, and the number of map reduce jobs that can run concurrently can be set. As one particular example, when $X_M$=MapReduce, it can be assumed that the quality of the generated model is proportional to the fraction of data $q_0$ processed by the MapReduce job to build the analytic model, and $q_0$ is a number between 0 and 1. In this embodiment, $Q_M=q_0$, where $q_0$ is defined below. This is further described with reference to FIG. 5.

Figure 5:
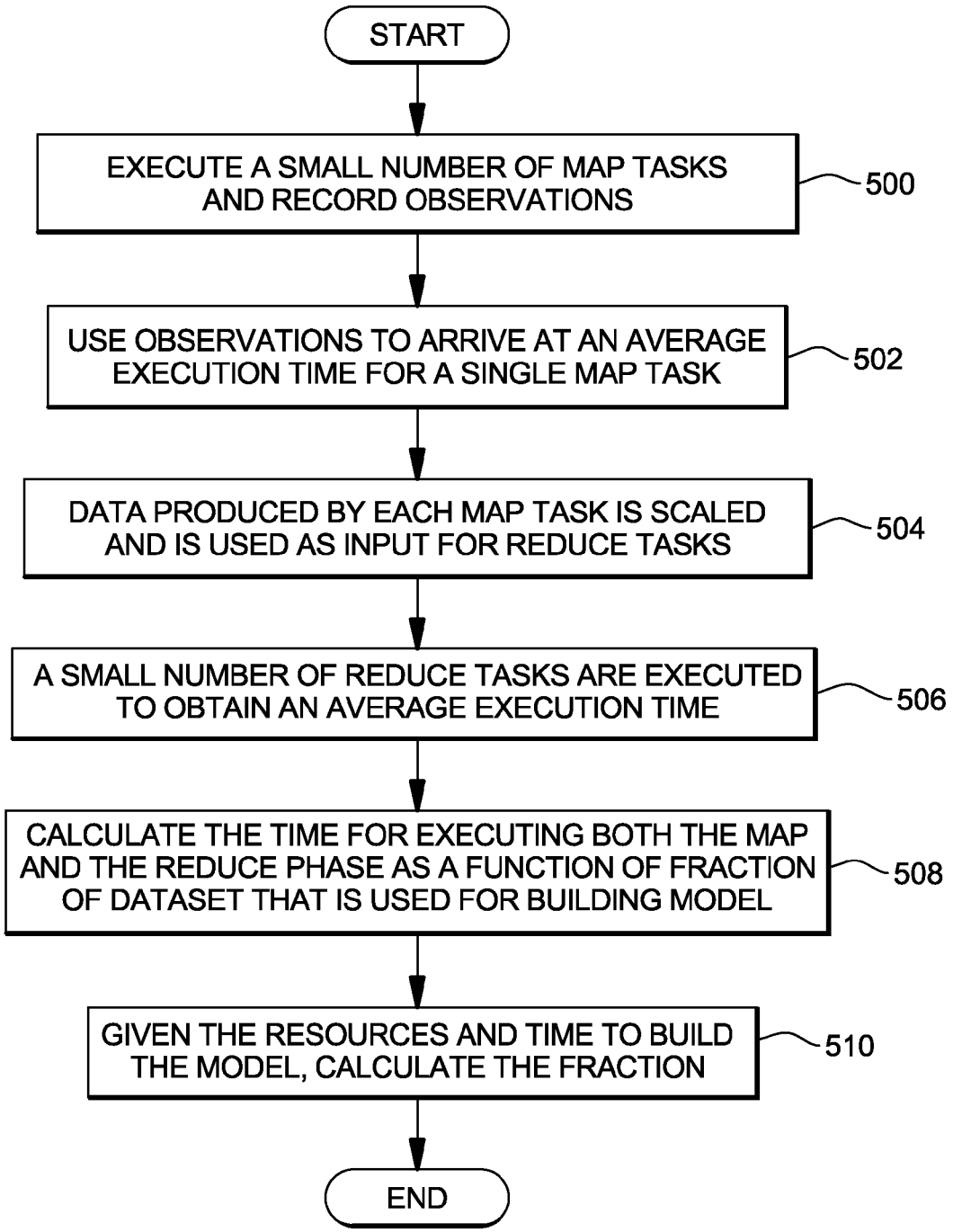
FIG. 5 depicts one example of the logic to determine the fraction of map tasks executed under given constraints, in accordance with an aspect of the present invention.

Referring to FIG. 5, in one example, a small number of map tasks are executed over fixed size chunks (e.g., 8 to 32 map tasks working on 256 MB chunks) from the dataset and the observations are recorded, STEP 500. These observations might, for example, include how long each of the mapping tasks is taking to complete, i.e., its execution time. A more sophisticated deployment might also consider how much CPU and memory are being consumed. These observations are used to arrive at, for instance, an average execution time $t_m$ for a map task, STEP 502. In a simplified example, if 8 map tasks are executed and their corresponding execution times are recorded as being: 2.11, 2.47, 2.80, 2.21, 2.50, 2.60, 2.70 and 2.33, the average execution time $t_m$ is computed as 2.47. The data produced by each map task in the above run is scaled by a factor of m/r (where m=number of map tasks, r=number of reduce tasks), and fed into a reduce task, STEP 504. Similar to map tasks, the observations are used to obtain an average execution time $t_r$ for reduce tasks, STEP 506. In a simple scenario, given a dataset, computing resources $R_M$ and a time constraint $T_M$ for building the analytic model, the time for executing the map phase can be calculated as the sum of $T_m$=ceil(q % m/n) % $t_m$ (where q=the fraction of map tasks that are executed, and n=k % $R_M$, where k is the number of concurrent map reduce tasks that can be executing on given computing resources at any given time), and the time taken to complete the reduce phase, which can be calculated as $T_r$=ceil (r/n) % $t_r$% q (where q=the fraction of map tasks executed in the map phase), STEP 508. Thereafter, $q_0$, i.e. the fraction of map tasks executed under the given constraints, is calculated by solving ($q_0$=max(q): $T_m+T_r<T_M$), STEP 510.

Similar approaches can be used for calculating the metric n (i.e., the number of concurrently executing map reduce tasks) when the dataset, the fraction of map tasks to be executed, and the time to construct the model are given as parameters. Appropriate adjustments are made for accommodating multiple tasks running on a single machine, and for incorporating the effect of map reduce phases like copying of data to reducers.

Using $Q_M$ (which, in one example, is equal to $q_0$), U is determined. In one embodiment, U could be expressed as:

$$U=k_1\%R_S\%Q_M$$

Although various functions and equations are provided herein for $Q_M$ and U for illustration purposes, many other algebraic formulations or procedural formulations (i.e., formulations based on rules) are possible.

Figure 6:
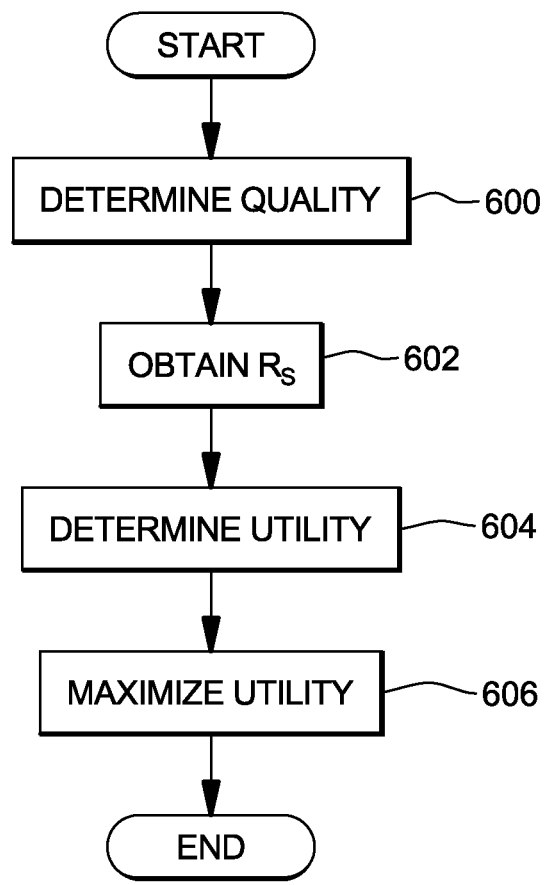
FIG. 6 depicts one example of the logic to determine and maximize utility of a real-time data analysis application, in accordance with an aspect of the present invention.

Subsequent to determining U, in accordance with an aspect of the present invention, that utility is maximized, as described with reference to FIG. 6. In one embodiment, Q (i.e., $Q_M$) is determined, STEP 600, as well as $R_S$, the amount of resources (e.g., number of nodes) allocated to the stream processing component of the real-time data analysis application, STEP 602. Thereafter, the utility of the application is determined using $R_S$ and Q, STEP 604. Further, the determined utility is maximized, as described below, STEP 606.

In one particular example, the utility (U) of the real-time data analysis application is related to the resources allocated to the stream processing component $R_S$ and the quality of the analytic model, $Q_M$. In one embodiment, the time L, taken by the stream processing component to process the incoming stream and the quality of the analytic model can be factors contributing to the utility of the real-time data analysis application. Thus, L could be determined using the following formulation, in one example:

$$L=k_1+(k_2/R_S),$$

where $k_1$ and $k_2$ are chosen constants (e.g., 1 and 2; or any other chosen values); i.e., the time taken to process the incoming stream decreases with increasing assignment of resources to the stream processing component.

Now, in the same embodiment, the quality of the generated analytical model Q could be expressed as the following formulation (independent of $T_M$ and $X_M$, in this example):

$$Q=k_3\%R_M, \text{ where } k_3 \text{ is a given constant;}$$

i.e., the quality of the analytic model increases with an increase in the allocation of resources to the model building component.

Finally, one utility formulation that could result from the above formulation is expressed as:

$$U=Q/L=(k_3\%R_M)/(k_1(k_2R_S))$$

Now, since:

$$R=R_S+R_M$$

The utility can be expressed as follows:

$$U=(k_3\%(R-R_S))/(k_1+(k_2+R_S))$$

The value of $R_S$ that maximizes the utility can then be determined by using well-known function optimization techniques from the existing literature. For example, one technique is to compute the first order derivative as follows:

$$dU/dR_S=((k_3\%R-2\%R_S)\%(k_1\%R_S+k_2)-k_1\% (k_3\%R\%R_S-(R_S)^2))/(k_1\%R_S+k_2)^2$$

and, then, compute the optimum $R_S$ value by solving $dU/dR_S=0$, yielding the following equation:

$$k_1\%(R_S)^2+2\%k_2\%R_S-k_3\%R\%_2=0$$

Solving this equation for $R_S$ and considering the following constant values, $k_1$=0, $k_2$=1, $k_3$=1, and R=100, as examples, $R_S$ would take the value of 50 (the negative value is discarded), making $R_M$=50 and the maximum utility U=2500, by plugging the computed values back in the equation that defines it.

In scenarios where the expression of utility is not expressed as a closed form expression, the allocations can be determined using an exhaustive search and/or other mathematical techniques to find the maxima, as well as by employing approximate heuristics. Both techniques have been described in the algorithmic optimization literature.

Note that the utility maximization step described herein is invoked multiple times throughout the lifetime of both the model building component and the stream processing component, aiming at keeping the overall utility as high as possible, in one example, in face of workload, as well as runtime changes.

Described in detail herein is a capability for increasing utility of a real-time data analysis application by managing one or more components of that application, including, for instance, the model building component and/or the stream processing component. In one example, the model building component is configured to maintain conformance to a specified management policy. That policy is expressed, in one example, as a formulation in terms of variables associated with the data analysis application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
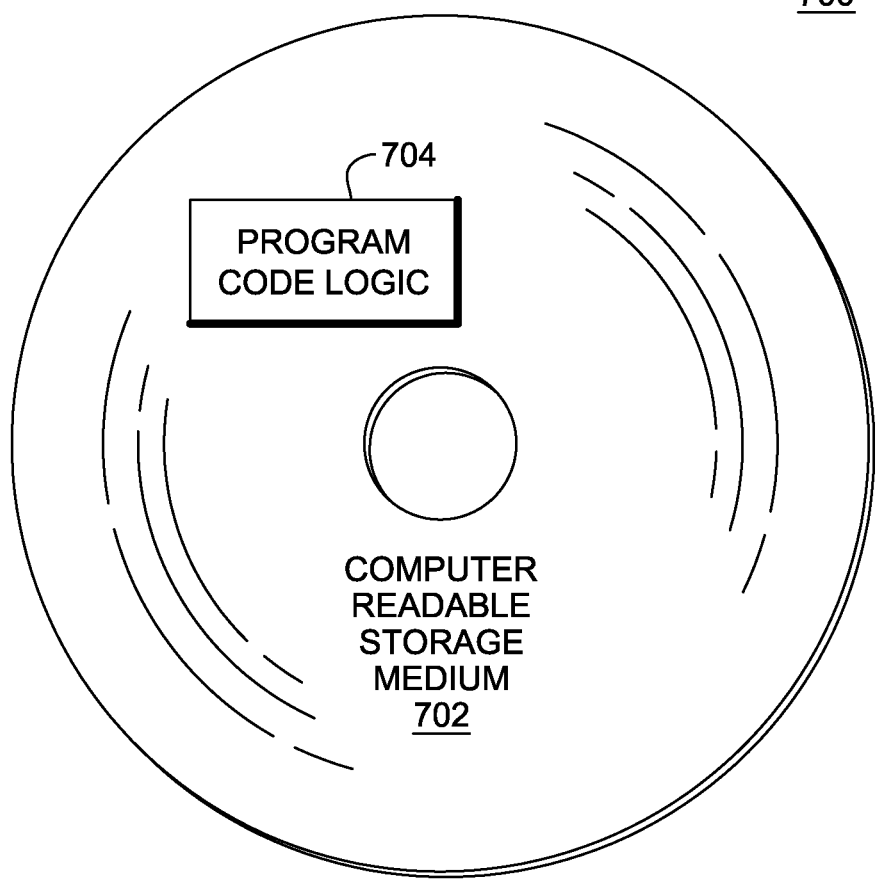
FIG. 7 depicts one embodiment of a computer program product incorporating one or more aspects of the present invention.

Referring now to FIG. 7, in one example, a computer program product 700 includes, for instance, one or more computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other algebraic formulations, other formulas, equations and/or expressions may be used to determine quality, utility, increased utility, maximum utility, etc. Additionally, procedural formulations that use particular rules to determine the values may be used, instead of or in addition to algebraic formulations. Although real-time data analysis applications are described herein, other types of data analysis applications can benefit from one or more aspects of the present invention. Further, although stock applications are described herein, one or more aspects of the present invention are applicable to other types of applications. Moreover, even though MapReduce is provided as one computational framework, others may also be used. For instance, large-scale distributed model building can be performed using applications that employ MPI (Message Passing Interface), PVM (Parallel Virtual Machine), Corba, as well as other distributed programming frameworks, as well as by making use of other model building systems that can tap distributed resources, such as gridMathematica. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of managing data analysis applications in a computing environment, said method comprising:
    determining current utility of a data analysis application using an algebraic formulation or a procedural formulation to determine the current utility, said data analysis application to analyze data produced by one or more sources and comprising a model building component and a stream processing component, the model building component using input from a dataset to build an analytic model to be used by the stream processing component to process a stream of data; and
    automatically adjusting, periodically by a processor, at least one of allocation of resources for the model building component or a configuration of the model building component, the configuration comprising at least one configuration parameter input from a resource configuration manager to the model building component for use in building the analytic model, wherein the automatically adjusting increases the current utility of the data analysis application.

2. The method of claim 1, wherein the automatically adjusting is based at least in part on metrics associated with the stream processing component.

3. The method of claim 1, wherein determining the current utility comprises using the algebraic formulation, and wherein the algebraic formulation is based at least in part on quality of an analytic model used by the stream processing component.

4. The method of claim 3, wherein the algebraic formulation comprises:

$$U=f(R_S,Q),$$

where U is the current utility, f is a selected function, $R_S$ is the resources allocated to the stream processing component, and Q is quality of the analytic model used by the stream processing component.

5. The method of claim 4, wherein:

$$Q=g(R_M,T_M,X_M),$$

where Q is the quality, g is a chosen function, $R_M$ is the resources allocated to the model building component, $T_M$ is a time period for updating the model building component, and $X_M$ is the model building component.

6. The method of claim 5, wherein $X_M$ is a computational framework.

7. The method of claim 1, wherein the automatically adjusting automatically adjusts allocation of resources for the model building component, and wherein the automatically adjusting allocation comprises changing a number of nodes allocated to the model building component.

8. The method of claim 1, wherein the automatically adjusting the configuration comprises changing one or more configuration parameters of the model building component.

9. The method of claim 1, wherein the automatically adjusting includes determining a maximum utility for the current utility.

10. The method of claim 1, wherein the at least one configuration parameter comprises one or more of: (i) an option to process a full or partial dataset for building the analytic model, (ii) an option to change a frequency of analytic model building, and (iii) an option to use an alternative analytic model building technique.

11. A system of managing data analysis applications in a computing environment, said system comprising:
  a memory; and
  a processor in communications with the memory, wherein the system is configured to perform a method comprising:
  determining current utility of a data analysis application using an algebraic formulation or a procedural formulation to determine the current utility, said data analysis application to analyze data produced by one or more sources and comprising a model building component and a stream processing component, the model building component using input from a dataset to build an analytic model to be used by the stream processing component to process a stream of data; and
  automatically periodically adjusting at least one of allocation of resources for the model building component or a configuration of the model building component, the configuration comprising at least one configuration parameter input from a resource configuration manager to the model building component for use in building the analytic model, wherein the automatically adjusting increases the current utility of the data analysis application.

12. The system of claim 11, wherein the automatically adjusting is based at least in part on metrics associated with the stream processing component.

13. The system of claim 11, wherein determining the current utility comprises using the algebraic formulation, and wherein the algebraic formulation is based at least in part on quality of an analytic model used by the stream processing component.

14. The system of claim 13, wherein the algebraic formulation comprises:

$$U=f(R_S,Q),$$

where U is the current utility, f is a selected function, $R_S$ is the resources allocated to the stream processing component, and Q is quality of the analytic model used by the stream processing component.

15. The system of claim 14, wherein:

$$Q=g(R_M,T_M,X_M),$$

where Q is the quality, g is a chosen function, $R_M$ is the resources allocated to the model building component, $T_M$ is a time period for updating the model building component, and $X_M$ is the model building component.

16. A computer program product for managing data analysis applications in a computing environment, the computer program product comprising:
  a non-transitory computer readable storage medium readable by a processor and storing instructions for execution by the processor for performing a method comprising:
  determining current utility of a data analysis application using an algebraic formulation or a procedural formulation to determine the current utility, said data analysis application to analyze data produced by one or more sources and comprising a model building component and a stream processing component, the model building component using input from a dataset to build an analytic model to be used by the stream processing component to process a stream of data; and
  automatically periodically adjusting at least one of allocation of resources for the model building component or a configuration of the model building component, the configuration comprising at least one configuration parameter input from a resource configuration manager to the model building component for use in building the analytic model, wherein the automatically adjusting increases the current utility of the data analysis application.

17. The computer program product of claim 16, wherein the automatically adjusting is based at least in part on metrics associated with the stream processing component.

18. The computer program product of claim 16, wherein determining the current utility comprises using the algebraic formulation, and wherein the algebraic formulation is based at least in part on quality of an analytic model used by the stream processing component.

19. The computer program product of claim 18, wherein the algebraic formulation comprises:

$$U=f(R_S,Q),$$

where U is the current utility, f is a selected function, $R_S$ is the resources allocated to the stream processing component, and Q is quality of the analytic model used by the stream processing component.

20. The computer program product of claim 19, wherein:

$$Q=g(R_M,T_M,X_M),$$

where Q is the quality, g is a chosen function, $R_M$ is the resources allocated to the model building component, $T_M$ is a time period for updating the model building component, and $X_M$ is the model building component.

* * * * *